(12) United States Patent
Oddie (10) Patent No.: US 8,521,450 B2
(45) Date of Patent: Aug. 27, 2013

(54) GAS/LIQUID FLOW RATE DETERMINATION

(75) Inventor: Gary Oddie, St. Neots (GB)

(73) Assignee: Schlumberger Technology Coporation, Sugar Land, TX (US)

( * ) Notice: Subject to any disclaimer, the term of this patent is extended or adjusted under 35 U.S.C. 154(b) by 137 days.

(21) Appl. No.: 12/472,754

(22) Filed: May 27, 2009

(65) Prior Publication Data

US 2010/0305880 A1 Dec. 2, 2010

(51) Int. Cl.
- G01F 1/00 (2006.01)
- G01F 7/00 (2006.01)
- G01F 1/34 (2006.01)
- G01F 1/44 (2006.01)

(52) U.S. Cl.
USPC .... 702/47; 73/861.04; 73/861.42; 73/861.52; 73/861.63

(58) Field of Classification Search
USPC ......... 702/47; 73/1.26, 1.35, 861.42, 861.04, 73/861.52, 861.63
See application file for complete search history.

(56) References Cited

U.S. PATENT DOCUMENTS

| | | | |
|---|---|---|---|
| 4,442,720 A * | 4/1984 | Apley et al. ................. | 73/863.31 |
| 5,007,293 A | 4/1991 | Jung | |
| 5,036,710 A | 8/1991 | King | |
| 6,378,380 B1 | 4/2002 | Kusters et al. | |
| 6,546,809 B1 * | 4/2003 | Andreussi .................. | 73/861.04 |
| 7,707,897 B2 * | 5/2010 | Ong ........................... | 73/861.04 |
| 2005/0188771 A1 * | 9/2005 | Lund Bo et al. ................. | 73/861 |
| 2006/0236779 A1 * | 10/2006 | Atkinson .................... | 73/861.03 |
| 2007/0095136 A1 * | 5/2007 | Hewitt et al. ................... | 73/200 |
| 2007/0193373 A1 * | 8/2007 | Xie et al. ..................... | 73/863.03 |
| 2009/0114038 A1 * | 5/2009 | Atkinson et al. ........... | 73/861.63 |
| 2009/0126502 A1 * | 5/2009 | Wee et al. .................. | 73/861.04 |
| 2009/0229375 A1 * | 9/2009 | Atkinson et al. ........... | 73/861.18 |

FOREIGN PATENT DOCUMENTS

| EA | 004076 B1 | 12/2003 |
|---|---|---|
| EP | 0076882 A1 | 4/1983 |
| GB | 2447490 A | 9/2008 |

OTHER PUBLICATIONS

Atkinson et al: "New generation multiphase flowmeters from Schlumberger and Framo Engineering AS", 17th International North Sea Flow Measurement Workshop, Oslo, Norway, Oct. 25-28, 1999.
Office Action of Chinese Patent Application Serial No. 201010193381.1 dated Aug. 29, 2011.

* cited by examiner

Primary Examiner — Jonathan C Teixeira Moffat
Assistant Examiner — Regis Betsch (57) ABSTRACT

A method and system is provided for measuring a flow rate of a gas/liquid flow. The method and system for measuring the flow rate include flowing a swirling gas/liquid flow separated into a gas core and a liquid outer layer through a conduit containing a constriction having a reduced conduit cross-section, measuring the differential gas core static pressure between a position upstream of the constriction and a position at the constriction, measuring a further quantity which provides the flow rate of the gas, the flow rate of the liquid, or a correlation between the flow rate of the gas and the flow rate of the liquid, and determining the flow rates of the gas and the liquid from the differential gas core static pressure and said measured further quantity.

16 Claims, 6 Drawing Sheets

GAS/LIQUID FLOW RATE DETERMINATION

FIELD

The present invention relates to the determination of flow rates in a gas/liquid flow.

BACKGROUND

The determination of gas and liquid flow rates in gas-liquid fluid mixtures is important in the oil and gas industry.

An example of an apparatus for measuring such flow rates is Schlumberger's Vx™ system (see, e.g., I. Atkinson, M. Berard, B.-V. Hanssen, G. Ségéral, 17$^{th}$ International North Sea Flow Measurement Workshop, Oslo, Norway 25-28 Oct. 1999 "New Generation Multiphase Flow meters from Schlumberger and Framo Engineering AS"), which comprises a vertically mounted Venturi flow meter, a dual energy gamma-ray hold up measuring device and associated processors. This system allows the simultaneous calculation of gas, water and oil volumetric flow rates in multi-phase flows.

Although providing proven performance, the Vx™ system and other conventional multiphase flow meters are relatively expensive, which tends to preclude their application in "brown" field sites (i.e. oil and gas wells where capacity has fallen below about 1000 barrels/day (0.0018 m$^3$/sec)) and other low hydrocarbon producers. However, such sites probably account for around 2-3 million oil and gas wells worldwide.

SUMMARY

Embodiments of the present invention are at least partly based on the realisation that in a swirling flow of a multiphase mixture—where the swirling of the multiphase mixture separates the multiphase mixture, when the mixture comprises gas and liquid, into a gas core and a liquid outer layer—the differential static pressure in the gas core between a position upstream of a constriction in the flow and a position at the constriction correlates the flow rates of the gas and the liquid in a known manner.

Thus, in general terms, embodiments of the present invention provide the use, in relation to a conduit containing a constriction having a reduced conduit cross-section and through which is conveyed a swirling gas/liquid flow separated into a gas core and a liquid outer layer, of:

a measured differential gas core static pressure between a position upstream of the constriction and a position at the constriction, and a measured further quantity which provides the flow rate of the gas, the flow rate of the liquid, or a correlation between the flow rate of the gas and the flow rate of the liquid;

for determining the flow rates of the gas and the liquid. That is, the two unknowns of the flow rate of the gas and the flow rate of the liquid can be determined from the two measurements.

For example, a first aspect of the present invention provides a method for measuring flow rates in a gas/liquid flow, the method including the steps of:

providing a conduit which conveys a swirling gas/liquid flow separated into a gas core and a liquid outer layer, the conduit containing a constriction having a reduced conduit cross-section, measuring the differential gas core static pressure between a position upstream of the constriction and a position at the constriction, measuring a further quantity which provides the flow rate of the gas, the flow rate of the liquid, or a correlation between the flow rate of the gas and the flow rate of the liquid, and determining the flow rates of the gas and the liquid from the differential gas core static pressure and said measured further quantity.

Optional features of the use and method are next described, the optional features being applicable, individually or in any combination, to the use and method.

The constriction reduces the flow area for the fluid flow. It has been found that this reduction in flow area generally causes a corresponding increase in the diameter of the gas core. Preferably, the upstream measurement position for the differential gas core static pressure is upstream of a region of increasing gas core diameter caused by the reduction in flow area produced by the constriction. Preferably, the downstream measurement position for the differential gas core static pressure is downstream of a region of increasing gas core diameter caused by the reduction in flow area produced by the constriction.

Typically, the conduit extends upstream of the constriction with a constant cross-section.

Preferably, the measured further quantity is the differential liquid layer pressure at the wall of the conduit between a position upstream of the constriction and a position at the constriction. This quantity, like the differential static pressure in the gas core, also correlates the flow rates of the gas and the liquid in a known manner. An advantage of the differential liquid layer pressure at the wall is that it is a simple and unobtrusive measurement to make, e.g. using wall tappings. However, alternatively, a measurement of the liquid flow rate could be taken, e.g. ultrasonically by an ultrasound probe which measures the liquid layer thickness and axial velocity (see GB A 2447490). Further techniques for obtaining a liquid layer thickness and axial velocity can rely on electrical, resistive, capacitive or nuclear approaches. Tracer methods can give liquid flow rates directly. Invasive probes (e.g. hot-wire, Pitot etc.) can also measure liquid velocities. A further, less desirable, alternative is to take a measurement of the gas flow rate e.g. using a hot wire in the gas core.

The gas density may also be measured and used in the determination of the flow rates. For example, the static gas core pressure at the constriction can be measured when measuring the differential gas core static pressure, and the temperature of the gas flow can also be measured (if it is not already known). The gas density can then be expressed in terms of these two measurements by applying a gas law.

Preferably, the conduit has a Venturi which provides the constriction, e.g. at the throat of the Venturi. However, alternatively, the constriction can be provided by another arrangement, such as an orifice plate. Typically, the constriction is concentric with the conduit and has a circular flow cross-section.

When the conduit has a Venturi, preferably the upstream measurement position for the differential gas core static pressure is upstream of the convergent section of the Venturi and the downstream measurement position for the differential gas core static pressure is at the throat section of the Venturi.

The conduit may have an endwall upstream of the constriction. The gas core can then extend to the endwall, and the differential gas core static pressure can be measured between a position at the endwall and a position at the constriction. This allows the upstream gas core pressure measurement to be made by a tapping through the endwall, rather than by a probe inserted into the fluid flow which can disturb the swirling flow.

The liquid may have two liquid phases (e.g. oil and water), and the method may further comprise the step of:

measuring the relative fractions of the two liquids, and wherein, in the determining step, the flow rates of the gas and each of the liquid phases are determined from the differential gas core static pressure, said measured further quantity and the relative fractions.

Due to the swirling flow and generally high velocity in the constriction, there will tend to be little separation of or slip between the two liquids. However, if necessary a slip law can be applied. Assuming the densities of the two liquids are known, the measurement of the relative fractions can be made indirectly by a density measurement of the liquid, e.g. ultrasonically, by microwaves, by gamma-rays, by infra-red detection etc. Conveniently, but not necessarily, the measurement of the relative fractions of the two liquids can be made at the constriction.

Preferably, the method further includes the step, before the measuring steps, of confirming that the gas core is present in the conduit.

A second aspect of the invention provides the use of the method of the first aspect (optionally including any one or any combination of optional features of that method) for measuring flow rates in the gas/liquid flow.

A third aspect of the invention provides an apparatus for providing measurements useable in determining flow rates in a gas/liquid flow, the apparatus including:

a conduit for conveying a swirling gas/liquid flow separated into a gas core and a liquid outer layer, the conduit containing a constriction having a reduced conduit cross-section;

a pressure meter for measuring the differential gas core static pressure between a position upstream of the constriction and a position at the constriction; and an arrangement for measuring a further quantity which provides the flow rate of the gas, the flow rate of the liquid, or a correlation between the flow rate of the gas and the flow rate of the liquid.

One embodiment of the present invention provides a processor for using with the apparatus configure to process the flow rates of the gas and the liquid of the gas/liquid flow from the differential gas core static pressure measured by the apparatus and the further quantity measured by the arrangement.

Optional features of the apparatus are next described, the optional features being applicable to the apparatus individually or in any combination. Any one or any combination of optional features of the method of the first aspect may also provide corresponding optional feature(s) of the apparatus.

Preferably, the upstream measurement position of the pressure meter is upstream of a region of increasing gas core diameter caused by the reduction in flow area produced by the constriction. Preferably, the downstream measurement position of the pressure meter is downstream of a region of increasing gas core diameter caused by the reduction in flow area produced by the constriction.

Typically, the conduit extends upstream of the constriction with a constant cross-section.

The apparatus may further include a swirl element for inducing the gas/liquid flow to swirl. For example, the swirl element can be a tangential slot inlet to the conduit. An alternative inline swirl element is e.g. a helical insert in the conduit or a motor-driven impeller.

Preferably, the arrangement for measuring the further quantity is a second pressure meter which measures the differential liquid layer pressure at the wall of the conduit between a position upstream of the constriction and a position at the constriction. The second pressure meter can have wall tappings at these positions. Alternatively, the arrangement can be an ultrasound probe which measures the liquid layer thickness and the liquid velocity profile.

Preferably, the conduit has a Venturi which provides the constriction, e.g. at the throat of the Venturi. However, alternatively, the constriction can be provided by another arrangement, such as an orifice plate. Typically, the constriction is concentric with the conduit and has a circular flow cross-section.

When the conduit has a Venturi, preferably the upstream measurement position of the first pressure meter is upstream of the convergent section of the Venturi and the downstream measurement position of the first pressure meter is at the throat section of the Venturi.

The conduit may have an endwall upstream of the constriction, the gas core extending, in use, to the endwall, and the pressure meter measuring the differential gas core static pressure between a position at the endwall and a position at the constriction. A tapping through the endwall can then provide the upstream position of the first pressure meters.

The apparatus may further include a device (such as an ultrasound probe) for confirming the presence of the gas core in the conduit.

Particularly when the liquid has two liquid phases, the apparatus may further include:

a probe for measuring the relative fractions of the two liquids; and wherein the flow rates of the gas and each of the liquid phases are determinable from the differential gas core static pressure, the measured further quantity and the relative fractions. The measurement of the relative fractions of the two liquids can be made at the constriction. The probe can be a densitometer. Such a device measures the combined density of the two liquids (which under the flow conditions in the constriction can be assumed to be not slipping relative to each other), and the relative fractions then determined from this measurement and the known densities of the individual liquids.

A fourth aspect of the invention provides a multiphase flow meter including the apparatus of the third aspect (and optionally including any one or combination of the optional features of the apparatus) and a computer system configured to determine the flow rates of the gas and the liquid from the differential gas core pressure and the measured quantity.

When the liquid has two liquid phases and the apparatus further includes a probe for measuring the relative fractions of the two liquids at the constriction, the computer system may be configured to determine the flow rates of the gas and each of the liquids phases from the differential gas core pressure, the measured quantity, and the relative fractions.

A fifth aspect of the invention provides an oil well pipeline or a gas well pipeline including an apparatus according to the third aspect (and optionally including any one or combination of the optional features of the apparatus), or a flow meter according to the fourth aspect (and optionally including any one or combination of the optional features of the flow meter).

A sixth aspect of the invention provides the computer system of the fourth aspect, a seventh aspect of the invention provides a corresponding computer program, and an eighth aspect of the invention provides a computer program product carrying the computer program of the seventh aspect.

Thus, the computer system of the sixth aspect can be configured to determine the gas and liquid flow rates in relation to a swirling gas/liquid flow separated into a gas core and a liquid outer layer and conveyed through a conduit containing a constriction having a reduced conduit cross-section, the determination being based on: (i) a measured differential gas core static pressure between a position upstream of the constriction and a position at the constriction, and (ii) a measured further quantity which provides the flow rate of the gas, the flow rate of the liquid, or a correlation between the flow rate of the gas and the flow rate of the liquid. Likewise, the computer program of the seventh aspect can determine the gas and liquid flow rates in relation to a swirling gas/liquid flow separated into a gas core and a liquid outer layer and conveyed through a conduit containing a constriction having a reduced conduit cross-section, the determination being based on: (i) a measured differential gas core static pressure between a position upstream of the constriction and a position at the constriction, and (ii) a measured further quantity which provides the flow rate of the gas, the flow rate of the liquid, or a correlation between the flow rate of the gas and the flow rate of the liquid. Again, optional features of the preceding aspects are applicable, individually or in any combination, to the sixth, seventh and eighth aspects.

BRIEF DESCRIPTION OF THE DRAWINGS

Embodiments of the invention will now be described by way of example with reference to the accompanying drawings in which.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Figure 1:
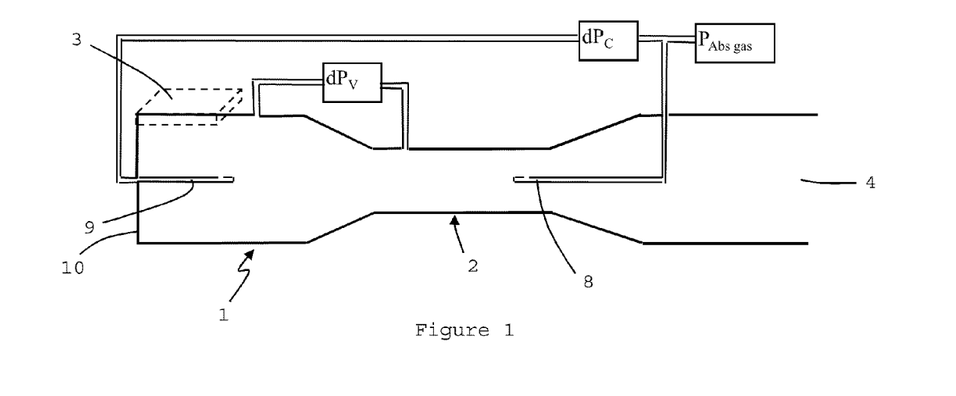
FIG. 1 shows schematically a flow meter according to a first embodiment of the present invention.

FIG. 1 shows schematically a flow meter according to a first embodiment of the invention for measuring flow rates in a two phase gas/liquid flow. The flow meter has a conduit 1 with a Venturi 2 providing a constriction which reduces the conduit cross-section. The conduit has an upstream tangential inlet 3 and a downstream outlet 4. The inlet creates a swirl sufficient to separate the gas from the liquid, leading to a gas core at the centre of the conduit and liquid annulus at the wall of the conduit, the core and annulus persisting through the constriction.

Figure 2:
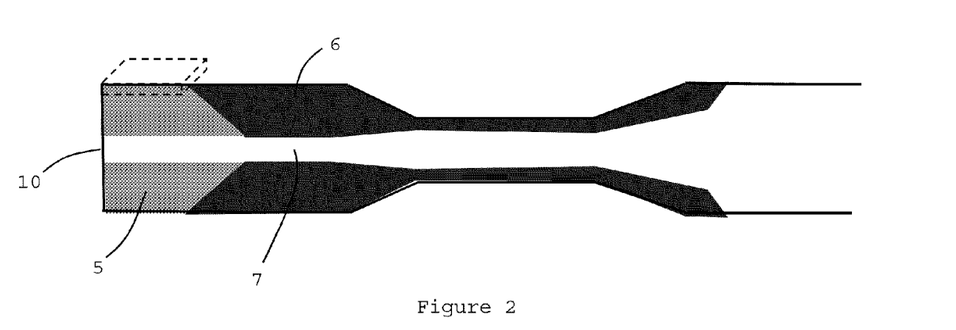
FIG. 2 shows a schematic cross-section through the swirling flow in the conduit of the flow meter of FIG. 1.

FIG. 2 shows a schematic cross-section through the swirling flow in the conduit. On entry into the conduit from the inlet, the gas/liquid flow forms a rotating mixture 5. The liquid annulus 6 develops quickly and becomes almost devoid of gas after only a short distance downstream of the inlet, typically equal to about one diameter of the conduit. The gas core 7 is approximately concentric with the conduit. The conduit extends with a constant cross-section upstream of the Venturi, and the core is generally cylindrical in this part of the conduit, although typically having a wavy interface with the liquid annulus. However, the reduction in cross-section produced by the convergent section of the Venturi typically causes the gas core diameter to expand slightly in diameter over a region whose axial extent approximately corresponds with that of the convergent section. At the divergent section of the Venturi the gas core typically expands still further. For some extreme flow conditions this pattern of gas core expansion and further expansion is not observed, but this does not affect the analysis discussed below.

The axial and tangential velocity profiles in the gas core and liquid annulus are quite complex, but the profiles and the shape of the gas/liquid interface have been found to be stable and to be replicated over very large ranges of gas and liquid flow rates.

Referring to FIG. 1 again, differential pressure measurements, $dP_v$, are taken across the Venturi with two wall tappings respectively positioned upstream and downstream of the convergent section. A probe 8 is positioned on the axis of the Venturi throat (i.e. in the middle of the gas core) to measure the static gas pressure at the throat, $P_{Abs\,gas}$, from which the gas density at that point can be determined, and a further probe 9 is positioned axially to measure the static gas pressure upstream of the convergent section of the Venturi, where the gas core is cylindrical and unaffected by the convergent flow. Differential pressure measurements, $dP_c$, are taken along the gas core between these two probes.

For gas/liquid two phase flows, the gas core has been found to reach back to the inlet and terminate on the end wall 10 of the conduit. This allows the upstream axial probe 9 (which can interfere with the swirl) to be removed, and the gas core static pressure upstream of the convergent section to be measured via a wall tapping, as shown in FIG. 3, which is a variant of the flow meter of FIG. 1.

Figure 3:
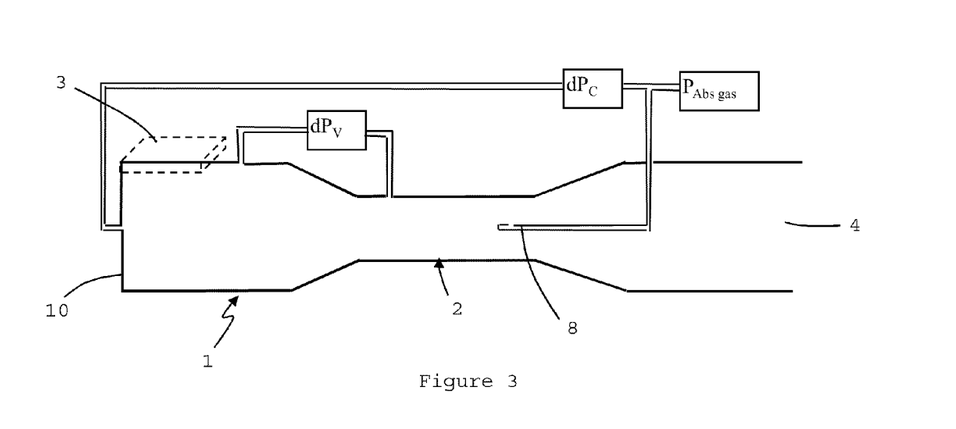
FIG. 3 shows schematically a variant of the flow meter of FIG. 1.

It has been found that the values of $dP_c$ measured using the arrangements of FIGS. 1 and 3 vary only slightly. Thus in the following discussion, experimental data from two sets of tests, which used both arrangements, are combined. In both test the conduit diameter was 2" (51 mm). The two phases of the flow were water and air.

Figure 4:
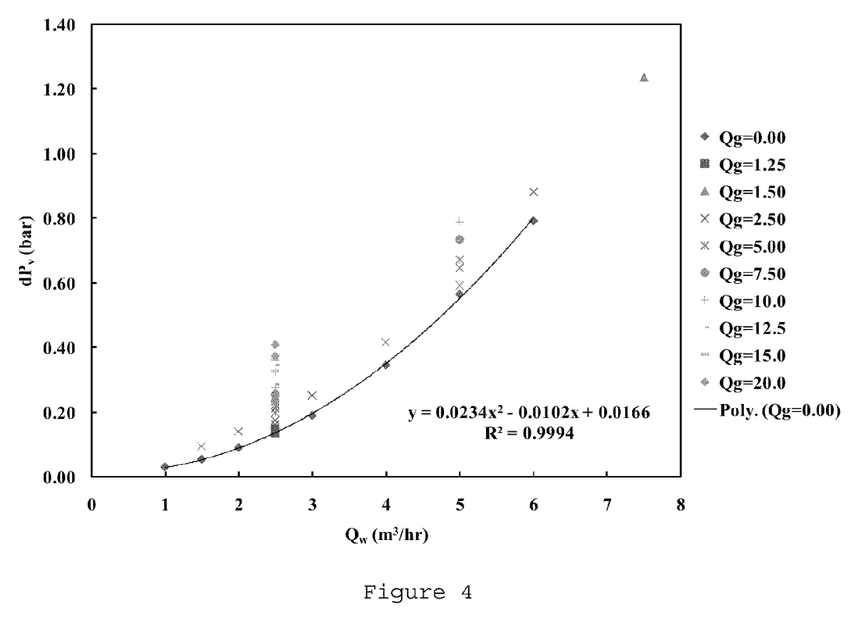
FIG. 4 is a plot of $dP_v$ against of $Q_w$ (water flow rate) sorted by $Q_g$ (gas flow rate)

FIGS. 4 to 7 show the experimental data. In FIG. 4, $dP_v$ is plotted as a function of $Q_w$ (water flow rate) sorted by $Q_g$ (gas flow rate), in FIG. 5, $dP_v$ is plotted as a function of $Q_g$ sorted by $Q_w$, in FIG. 6, $dP_c$ is plotted as a function of Qw sorted by $Q_g$, and in FIG. 7, $dP_c$ is plotted as a function of $Q_g$ sorted by $Q_w$. Unless otherwise stated, $Q_w$ is in m³/hr, $Q_g$ is in scfm (at conditions of 100 kPa and 273.15 K), and pressures are in bar. For all the experiments, $P_{Abs\,gas}$ was approximately constant at 0.34 bar (34 kPa).

Figure 5:
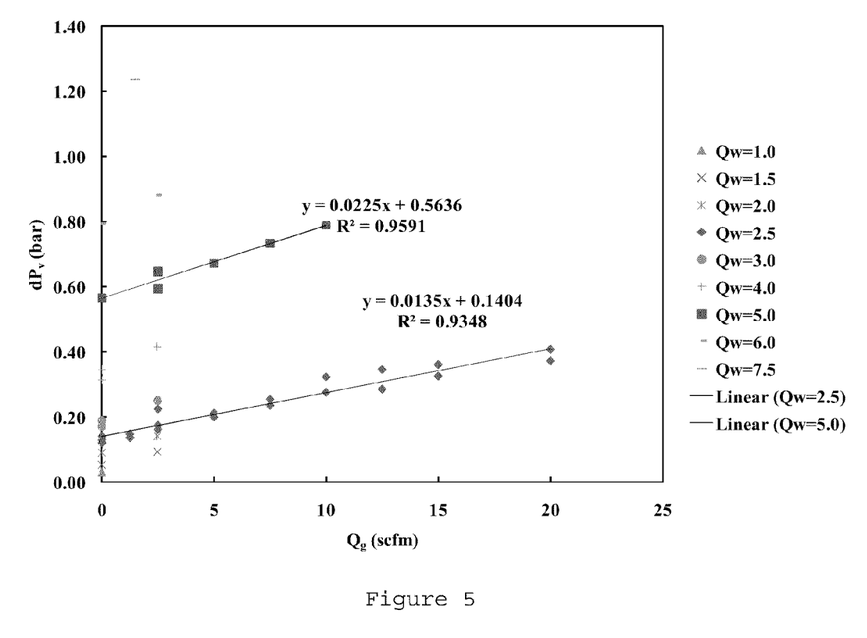
FIG. 5 is a plot of $dP_v$ against $Q_g$ sorted by $Q_w$.
Figure 6:
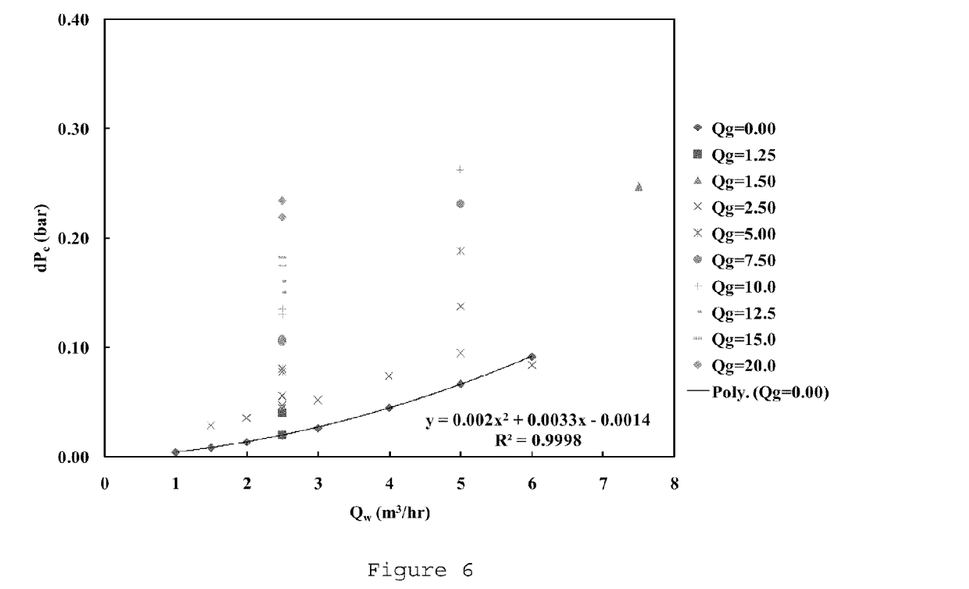
FIG. 6 is a plot of $dP_c$ against $Q_w$ sorted by $Q_g$.
Figure 7:
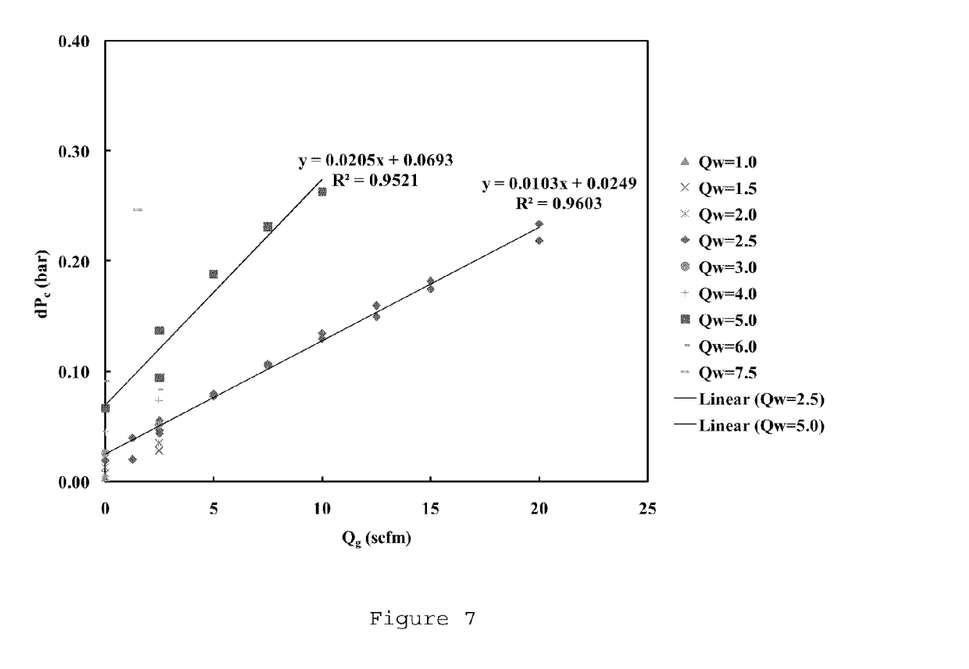
FIG. 7 is a plot of $dP_c$ against $Q_g$ sorted by $Q_w$.

From the data shown in FIGS. 4 and 5, the following correlation can be extracted:

$$dP_v = a_1 Q_w^2 + a_2 Q_w Q_g$$

and from the plots shown in FIGS. 6 and 7:

$$dP_c = a_3 Q_w^2 + a_4 Q_w Q_g$$

with the values for the constants $a_1$, $a_2$, $a_3$ and $a_4$ being derived as:

$a_1 = 0.02263$ $a_2 = 0.005543$ $a_3 = 0.002597$ $a_4 = 0.004571$

Figure 8:
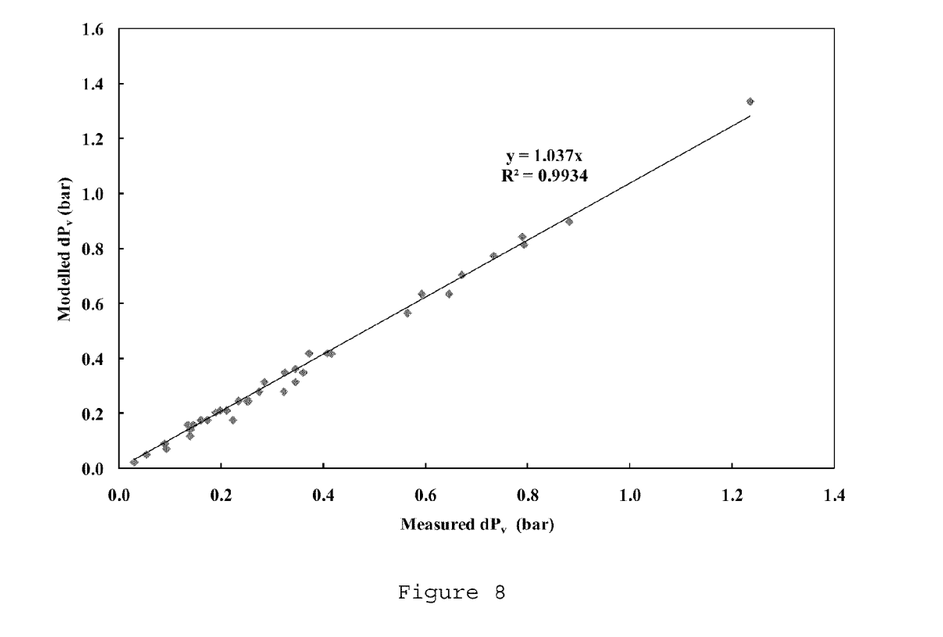
FIG. 8 plots predicted against measured $dP_v$.
Figure 9:
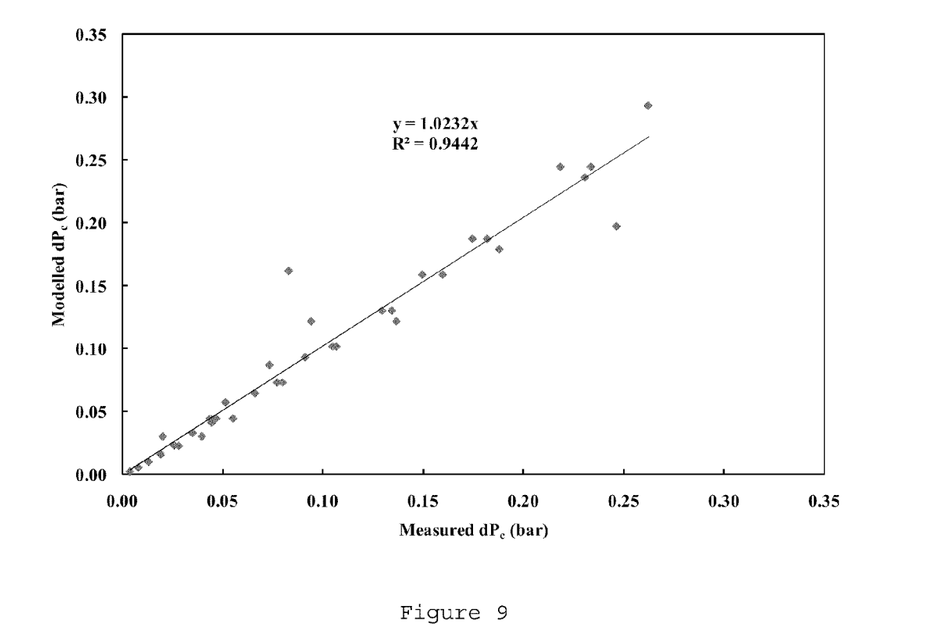
FIG. 9 plots predicted against the measured $dP_c$.

As the reference flow rates, $Q_w$ and $Q_g$, are known, the two correlation equations above and the derived constants can be used to predict the pressure drops for all of the experiments and to compare with the corresponding experimentally measured values. FIGS. 8 and 9 respectively plot the predicted against the measured $dP_v$ and the predicted against the measured $dP_c$, and demonstrate the good agreement between prediction and measurement.

Next, the correlation equations are rearranged to extract $Q_w$ and $Q_g$ as follows:

$$Q_w = \left(\frac{a_4 dP_w - a_2 dP_c}{a_1 a_4 - a_2 a_3}\right)^{1/2}$$

And $$Q_g = \frac{1}{(a_1 a_4 - a_2 a_3)^{1/2}} \frac{a_1 dP_c - a_3 dP_v}{(a_4 dP_v - a_2 dP_c)^{1/2}}$$

Figure 10:
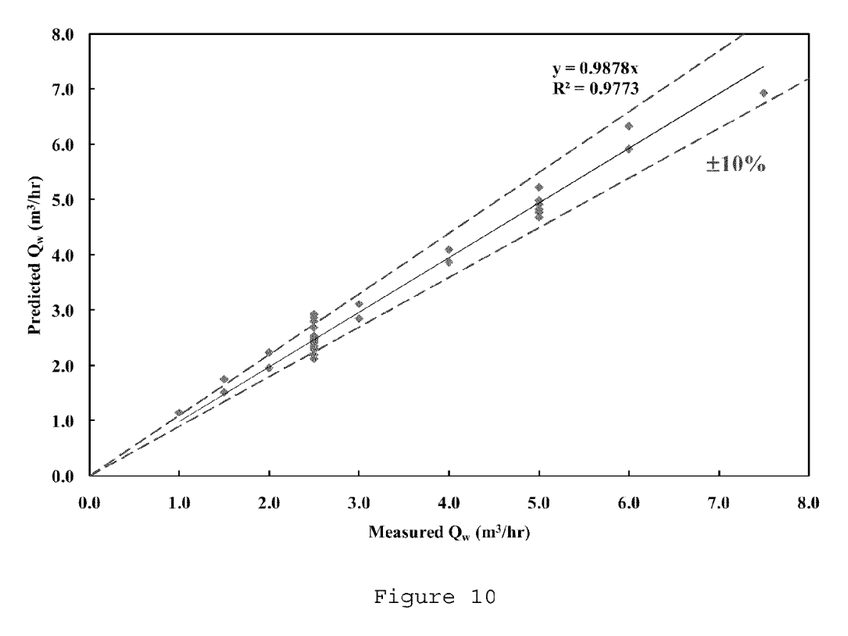
FIG. 10 plots predicted against measured $Q_w$.
Figure 11:
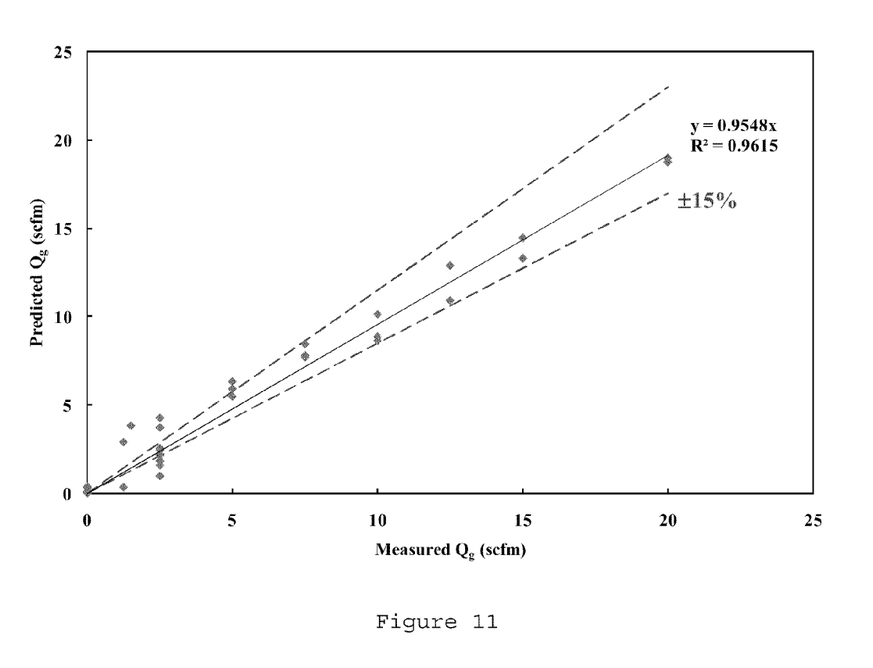
FIG. 11 plots predicted against the measured $Q_g$.

Taking the above values of $a_1$ to $a_4$ and using the experimentally measured $dP_v$ and $dP_c$ in the above equations, allows $Q_w$ and $Q_g$ to be predicted for all of the experiments and to be compared with the corresponding experimentally measured values. FIGS. 10 and 11 respectively plot the predicted against the measured $Q_w$ and the predicted against the measured $Q_g$, and again demonstrate the good agreement between prediction and measurement.

While for a given flow meter a direct calibration can be used to determine the constants $a_1$ to $a_4$, they can also be determined in terms of the geometry of the conduit and the fluid properties. Thus the correlations between $dP_v$ and $Q_w$ and $Q_g$, and between $dP_c$ and $Q_w$ and $Q_g$ can be expressed more generally as:

$$dP_v b_1 \rho_L Q_w^2 + b_2 \rho_L Q_w Q_g$$

$$dP_c = b_3 \rho_G Q_w^2 + b_4 \rho_L Q_w Q_g$$

where $\rho_L$ and $\rho_G$ are the liquid and gas densities and the values for the constants $b_1$, $b_2$, $b_3$ and $b_4$ are derived as:

$b_1 = 2.26 \times 10^{-5}$ $b_2 = 5.54 \times 10^{-6}$ $b_3 = 1.62 \times 10^{-3}$ $b_4 = 4.57 \times 10^{-6}$ The measured $P_{Abs\,gas}$ gives the gas density, while the liquid density is generally known or if not known can be readily measured using a densitometer.

For example, gas density can be related to the measured $P_{Abs\,gas}$ by:

$$\rho_{gas} = \frac{MW_{gas}}{R_{gas} P_{atm}} \frac{P_{Absgas}}{T[K]} = k_{gas} P_{Absgas}$$

where $MW_{gas}$ is the gas molecular weight, $R_{gas}$ is the gas constant, T is the gas temperature (in Kelvin), and $P_{atm}$ is atmospheric pressure. The gas temperature is generally known, or can be measured if necessary by techniques known to the skilled person The flow meter can have a computer system (not shown in FIGS. 1 and 3) which receives the $dP_v$ and $dP_c$ measurements from the pressure meters and uses the above equations to determine $Q_w$ and $Q_g$ for any flow condition.

Figure 12:
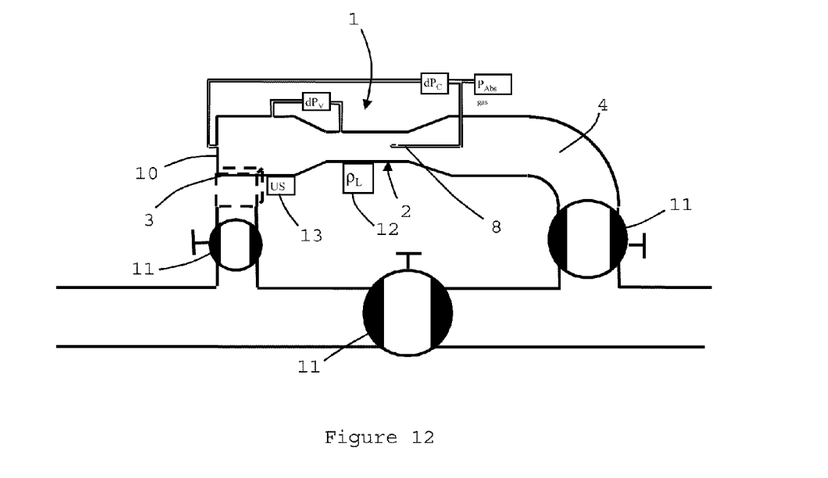
FIG. 12 shows schematically a flow meter according to a second embodiment of the present invention.

FIG. 12 shows schematically a flow meter according to a second embodiment of the invention for measuring flow rates in a three phase flow consisting of a gas and two liquids (e.g. oil and water). Features of the second embodiment which correspond to features of the first embodiment have the same reference numbers in FIG. 12. The flow meter is shown as by-pass to a main flow conduit, valves 11 controlling flow through the main flow conduit and the by-pass. Some liquid/liquid separation is observed in the rotating flow, but the mixing and velocity in the throat significantly reduces the amount of liquid/liquid slip, such that it can effectively be ignored. Thus to determine the two liquid flow rates, the liquid passing through the flow meter is probed or sampled to determine the flowing liquid oil/water fraction (WLR), typically via a probe 12 which measures the liquid density.

Even with a zero gas flow rate, a gas core can persist in the conduit. Thus, the flow meter has a second probe 13 (e.g. an ultrasound probe) which confirms that there is a gas core in the conduit. The indication from the second probe allows the correlation equations to be adjusted if necessary, a different correlation between the measured quantities and the gas and liquid flow rates being required depending on whether or not a gas core is present. Indeed, a probe, such as the second probe, can also be fitted to a flow meter of the first embodiment to ensure that a gas core is present.

Figure 13:
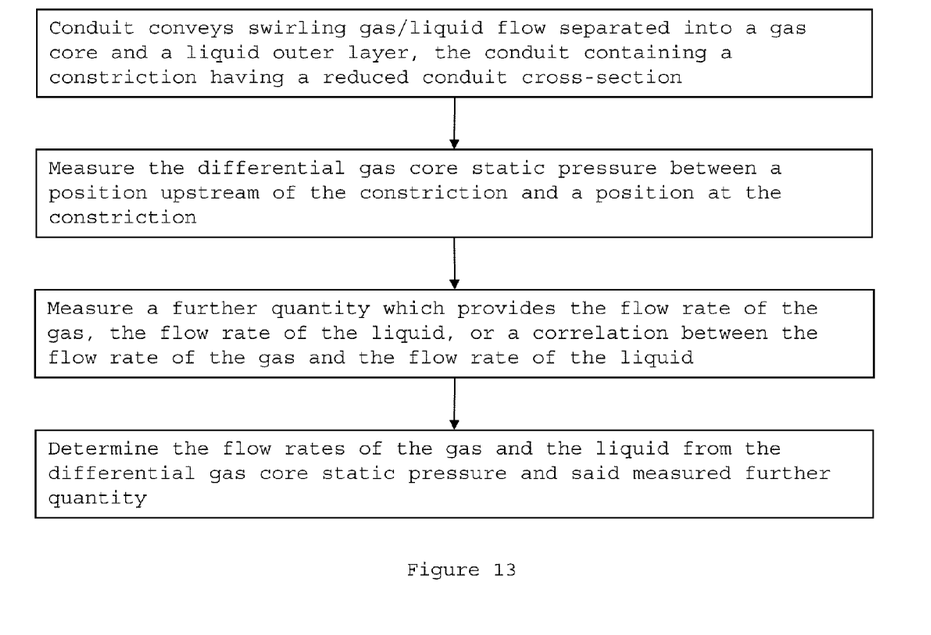
FIG. 13 shows a flow diagram illustrating a method for measuring flow rates in a gas/liquid according an embodiment of the present invention.

FIG. 13 shows a flow diagram illustrating a method for measuring flow rates in a gas/liquid flow according to the present invention.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the scope of the invention.

All references referred to above are incorporated by reference.

The invention claimed is:

1. A method for measuring flow rates in a multiphase flow comprising a gas phase and a liquid phase, the method including the steps of:
    swirling the multiphase flow through a conduit that comprises a constriction having a reduced conduit cross-section, wherein the swirling of the multiphase flow separates the multiphase flow in the conduit into a central gas core and a liquid outer layer;
    measuring a differential gas core static pressure between a position upstream of the constriction and a position in the constriction, wherein the gas core static pressure is measured in the central gas core at the upstream position and the constriction position;
    measuring a further quantity which provides the flow rate of the gas, the flow rate of the liquid, or a correlation between the flow rate of the gas and the flow rate of the liquid; and
    determining the flow rates of the gas and the liquid from the differential gas core static pressure and said measured further quantity.

2. A method according to claim 1, wherein said measured further quantity is the differential liquid layer pressure at the wall of the conduit between a position upstream of the constriction and a position at the constriction.

3. A method according to claim 1, wherein the constriction is provided by a Venturi.

4. A method according to claim 1, wherein the conduit has an endwall upstream of the constriction, and wherein the central gas core extends to the endwall and the differential gas core static pressure is measured between a position at the endwall and a position at the constriction.

5. A method according to claim 1, wherein the multiphase flow comprises two liquid phases, and the method further comprises the step of:
    measuring the relative fractions of the two liquid phases; and
    wherein, in the determining step, the flow rates of the gas and each of the liquid phases are determined from the differential gas core static pressure, said measured further quantity and the relative fractions.

6. A method according to claim 1, further comprising the step of:
    confirming that the central gas core is present in the conduit.

7. An apparatus for providing measurements useable in determining flow rates in a multiphase flow comprising a gas phase and a liquid phase, the apparatus including:
    a conduit for conveying a swirling multiphase flow that is separated into a central gas core and a liquid outer layer, the conduit containing a constriction having a reduced conduit cross-section;
    a pressure meter for measuring the differential gas core static pressure between a position upstream of the constriction and a position within the constriction, wherein the pressure meter is configured to measure pressures of the central gas core at the upstream position and the constriction position; and
    a device for measuring a further quantity which quantity provides at least one of a flow rate of the gas, a flow rate of the liquid and a correlation between the flow rate of the gas and the flow rate of the liquid.

8. An apparatus according to claim 7, further comprising:
    a processor configured to determine at least one of the flow rates of the gas and the liquid in the gas/liquid flow from the differential gas core static pressure and said measured further quantity.

9. An apparatus according to claim 7, further including a swirl element for inducing the multiphase flow to swirl.

10. An apparatus according to claim 7, wherein said device is a second pressure meter configured to measure the differential liquid layer pressure at the wall of the conduit between a position upstream of the constriction and a position at the constriction.

11. An apparatus according to claim 7, wherein the constriction is provided by a Venturi.

12. An apparatus according to claim 7, wherein the conduit comprises an endwall upstream of the constriction, the central gas core extending, in use, to the endwall, and the pressure meter measuring the differential gas core static pressure between a position at the endwall and a position at the constriction.

13. An apparatus according to claim 7, further comprising:
    a sensor for confirming the presence of the central gas core in the conduit.

14. An apparatus according to claim 7, wherein the multiphase flow comprises two liquid phases and the apparatus further includes:
    a probe for measuring the relative fractions of the two liquid phases; and
    wherein the flow rates of the gas and each of the liquid phases are determinable from the differential gas core static pressure, said measured further quantity and the relative fractions.

15. An apparatus according to claim 14, further comprising:
a processing system configured to determine the flow rates of the gas and each of the liquids phases from the differential gas core pressure, said measured quantity, and the relative fractions.

16. An oil well pipeline or a gas well pipeline including an apparatus according to claim 7.

* * * * *